United States Patent [19]
Platou

[11] 3,922,809
[45] Dec. 2, 1975

[54] PROCESS FOR PRODUCING NET DEVICES

[76] Inventor: Jan H. Platou, Birkelundsbakken 76, 5040 Paradis, Norway

[22] Filed: Jan. 21, 1975

[21] Appl. No.: 542,768

[52] U.S. Cl. ............................ 43/7; 43/14; 112/262
[51] Int. Cl.² ......................................... A01K 73/00
[58] Field of Search ..................... 112/262; 43/7, 14

[56] References Cited
UNITED STATES PATENTS
2,894,366  7/1959  Leckie ............................... 43/14 X
FOREIGN PATENTS OR APPLICATIONS
1,381,021  10/1964  France ...................................... 43/7
1,133,941  7/1962  Germany ................................... 43/7

*Primary Examiner*—H. Hampton Hunter

[57] ABSTRACT

Process for producing net devices by mechanically mounting a floating line or cordage for receiving a floating material and a sinking line or cordage for receiving a weight-increasing material at local fastening points along opposite side edges of a line of netting by way of fastening lines associated with the latter. The line of netting is drawn intermittently in a path through a mesh-diverging zone and a subsequent fastening zone controlled by fastening lines which are maintained stretched out in both zones. Edge meshes along opposite sides of the line of netting are drawn up freely along respective fastening lines in the mesh-diverging zone, the weight of the netting having the effect of both ensuring a desired degree of spreading of the edge meshes on the lines and maintaining the meshes undisplaceably in position thereon in the fastening zone. In the fastening zone, the fastening lines are separately fastened to the respective floating and sinking lines at the fastening points. The edge meshes are thus anchored between the fastening points and by way of the latter are drawn forward in the intermittent movement between each fastening operation.

6 Claims, 3 Drawing Figures

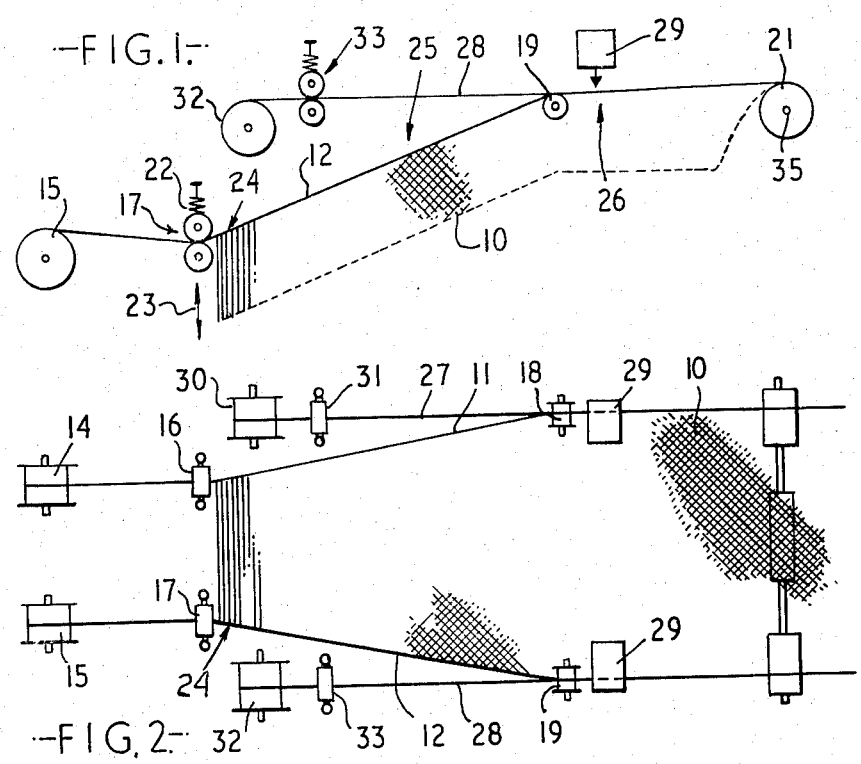
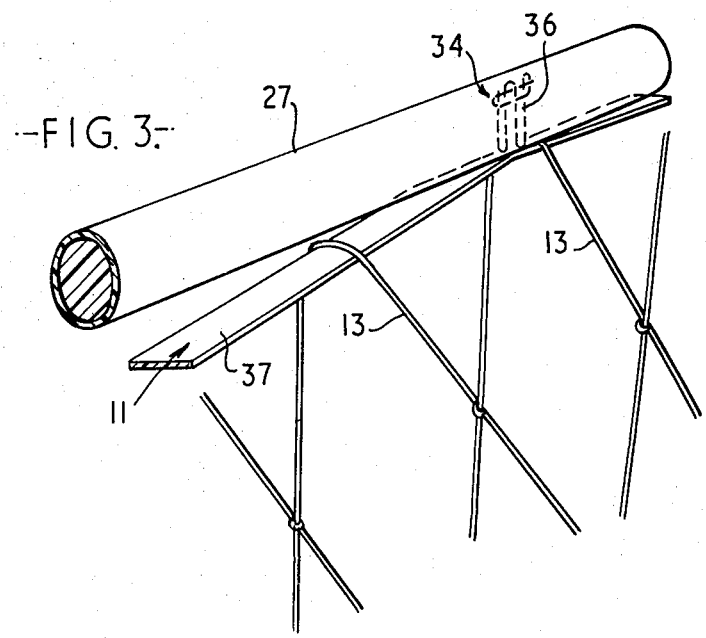

PROCESS FOR PRODUCING NET DEVICES

BACKGROUND OF INVENTION

1. Field of Invention

This invention relates to a process for producing net devices by mechanically mounting a floating line for the reception of floating material and a sinking line for the reception of water-increasing material at local fastening points along opposite side edges of a line of netting by way of fastening lines associated with the latter.

The present invention finds particular application in the production of fishing devices, such as fish bag nets and various fishing nets, trawl devices and the like, as well as in other types of net-forming means, such as camouflage nets, tennis nets etc..

2. Description of the Prior Art

Hitherto net or trawl lines have been fastened on floating lines or cordage manually and mainly as part-production in so-called "home production". The work of mounting has been time-consuming and as a consequence of rising labour costs, it has proved gradually more difficult to get a sufficient supply of labour. The mounting work has, in substance, been carried out by drawing a fastening line along the line or cordage and binding it around the latter and a mesh fastening at definite intervals and with precise distances between the mesh fastenings. It is of the greatest importance that there are employed accurate distances between the mesh fastenings so that the desired number of meshes can be spread in series in the desired manner. This fastening work is complicated since the fastening line is also utilised for continuous binding around. Even with the most accurately working, skilled labour, it is almost impossible to obtain a totally accurate length on the finally mounted edge of the fishing device produced. There can occur, in part, large deviations between the lengths of the two opposite edges of the fishing device since these edges are mounted on the associated line separately. With such deviations in the lengths of the edges, the fishing devices can become rather distorted and more or less unusable, the mesh formations being obliquely disposed or flattened so that stripes are formed in the mesh wall and an adequate fishing effect cannot be achieved.

In order to obtain a desirably uniform distribution of the edge meshes and to maintain such a uniform distribution thereof during the fastening operation itself, it has hitherto been considered necessary in mechanical production to utilise rather complicated apparatus such as is referred to in Norwegian Patent Specification No. 119,607.

SUMMARY OF THE INVENTION

In the present invention, the aim is to mount mechanically both the lines or both the cordages in position at the same time so as to obtain a rapid production operation with, in addition, the lines or cordages readily located with fastening points arranged in a controlled manner facing each other so that in the finished device, the two opposite longitudinal edges have an accurately adjusted length. Furthermore, a special objective is a process in which the meshes can be spread in an especially easy and accurate manner resulting in their being distributed in precisely the desired manner at the edges of the device between successive fastening points.

It is desirable to mount a floating line or a sinking line to a fastening line at definite fastening points so that edge meshes of a line of netting which pass over the fastening lines can after mounting be effectively guaranteed a position with a desired spread on those lines. The fastening points ensure that the edge meshes can be held in position on the fastening lines without engaging the edge meshes directly.

The process of this invention involves drawing a line of netting intermittently in a path through a mesh-diverging zone and a subsequent fastening zone controlled by fastening lines each of which passes through its respective one of opposite rows of meshes at the edges of the line of netting with the fastening lines being maintained constantly stretched out in both of these zones. In the mesh-diverging zone, the edge meshes are drawn up freely in an upwardly and obliquely rising movement along the fastening lines whereby the weight of the netting has the effect of both ensuring a desired degree of spreading of these meshes on the lines and maintaining them undisplaceably in position thereon in the fastening zone. In the fastening zone, separate fastening of the fastening lines to the respective floating and sinking lines at the fastening points is effected. Thus, the edge meshes are anchored between these points and by way of the latter are drawn forward in the intermittent movement between each fastening operation.

By protecting such a constantly and tautly stretched fastening line in the mesh-diverging zone, there is obtained, in a controlled manner, a desired spreading of the edge meshes by themselves. The otherwise normal and mechanical auxiliary means which is necessary for conventional mounting is avoided therefore. Moreover, with such a stretched fastening line, the desired distribution of the edge meshes on that line in the fastening zone can be maintained without the use of additional means.

The use of separate fastening means, such as sewing thread, instead of the fastening line itself as in prior techniques, besides enabling the fastening line to be maintained in the aforesaid stretched condition, ensures guidance of fastening line and sinking line or floating line in a precisely controlled manner relative to the apparatus for the application of the separate fastening means.

While fastening of the lines can be effected by arbitrary means, it is preferred to employ sewing machines which locally sew the fastening line securely and directly to the associated floating line or sinking line by means of through-seam lines.

Furthermore, it is preferred that the fastening lines be designed as bands with a substantially greater breadth than height. In this way, mechanical sewing together of the lines can be effected in a ready manner with the seam lines directed, as far as possible, centrally through the lines.

BRIEF DESCRIPTION OF DRAWINGS

In order that the invention can be more clearly understood, a preferred embodiment thereof will now be described, by way of example, with reference to the accompanying drawings in which:

FIG. 1 is a schematic view of an apparatus for carrying out the process of the present invention, as seen from the side, FIG. 2 is a schematic plan view of the apparatus of FIG. 1, and FIG. 3 is a cut-off, perspective view of part of a bag net produced according to the invention on an enlarged scale.

DESCRIPTION OF PREFERRED EMBODIMENT

Referring to FIGS. 1 and 2, netting line 10 is engaged to fastening lines 11 and 12 along opposite longitudinal edges thereof, the fastening lines being threaded through respective rows of edge meshes 13 as shown in FIG. 3. The fastening lines are received on their respective storage pulleys 14,15 and pass through their respective brake arrangements 16,17 and over their respective bending rolls 18,19 to their respective drawing pulleys 20,21. Each fastening line is thus drawn in a first arbitrary path between the storage pulley and the brake arrangement and in an oblique, upwardly rising path between the brake arrangement and the bending roll, the path between the latter and the drawing pulley being horizontal. By means of the brake arrangement which has an adjustable braking effect as indicated by the spring 22, the tractive force in the fastening line can be regulated so that the line passes in an extended, rectilinear path between the brake arrangement and the bending roll and between the latter and the drawing pulley. The brake arrangement is displaceable in the vertical direction as is indicated by the arrows 23 so that the oblique course of the fastening line between the brake arrangement and the bending roll can be adjusted as required. The line of netting 10 is threaded into place on the fastening lines 11,12 downstream relative to the brake arrangement as is illustrated by bundle 24 adjacent the brake arrangement. By means of the oblique upwardly rising path of the fastening line from the brake arrangement to the bending roll, there is formed a mesh-diverging zone 25 in which the line of netting 10 can be spread out under the influence of the weight thereof along the rectilinearly extended fastening lines to a desired extent dependent on the thickness of the thread of the netting line, by adjusting the vertical position of the brake arrangement as required. With the aid of the subsequent horizontal path for the fastening lines, there can be assured an accurate course therefor to form a fastening zone 26 in which the respective fastening lines are fastened to a floating line 27 and a sinking line 28 by means of their respective fastening arrangements 29. The floating line 27 is mounted on a supply spool 30 and extends, via a brake arrangement 31, in a substantially horizontal path over to the bending roll 18 and further, together with the fastening line, to the fastening zone 26 so as to be fastened there with the fastening line 11 in a manner which will be described further below. Correspondingly the sinking line 28 is mounted on a supply spool 32 and extends, via a brake arrangement 33 and the bending roll 19, to the fastening zone 26 so as to be fastened with a fastening point to the fastening line 12. From the common fastening point 34 between the lines 11 and 27 (see FIG. 3) or the common fastening point between the lines 12 and 28 (not shown), the lines are drawn jointly over to the draw pulley in order to be wound up on the latter or in order to be delivered in a suitable manner to a suitable delivery location. In the last-mentioned instance, it is preferred to utilise, in addition to the draw pulley, a clamping pulley with a view to clamping the lines in driving engagement with the draw pulley.

As shown in FIG. 2, the draw pulleys 20,21 are connected to each other via a common drive shaft 35, the motor not being shown further. If desired, the connection between the draw pulleys includes an exchanger with which the speed of the one pulley can be adjusted relative to the other. In all cases, a synchronous operation of the draw pulleys is preferred so that the latter can be driven intermittently in an accurately controlled manner, adapted according to the operation of the two fastening arrangements 29 so that the fastening operation for the two fastening arrangements can be effected at precisely the same time in the interval between each forward movement of the fastening lines in the intermittent operation. In this way, the accurate disposition of the fastening points directly opposite each other is ensured in the finished fishing net device.

As mentioned above, the fastening of the sinking line to its fastening line and the fastening of the floating line to its fastening line, can be effected in an arbitrary manner as desired, for example, by tying around with a further fastening means, such as a fastening thread, clamp sleeve or the like. The clamp sleeve can, if necessary, be closed with a seam line of a sewing machine or by point welding. In the preferred embodiment as illustrated in the drawings, there is utilised a fastening arrangement 29 in the form of a sewing machine which sews the lines 11,27 (or the lines 12,28) with a seam line 36 as shown in FIG. 2. The seam line is designed in a knot-forming manner so that the sewing thread provides a self-locking effect. In order to obtain the simplest possible sewing-on operation, it is preferred that the fastening line be designed as a flat band 37 (see FIG. 2) with a substantially greater breadth than height so that the seam line can be led readily through the floating line (or the sinking line) and the fastening line at the same time. By employing a fastening line with a rounded cross-section, there is the risk, on the other hand, that the seam line comes across by the side of the fastening line and as a result, is not fastened to the latter in the intended manner since the fastening line has a substantially smaller cross-section than the floating line (or the sinking line). As is known, the floating line can be constructed of an outer stocking which surrounds a floating composition while correspondingly the sinking line can be constructed of an outer stocking which surrounds a weight-increasing composition. By designing the fastening line in the form of a band, the fastening line does not need to have a substantially greater cross-sectional area than a fastening line with a rounded cross-section but will, nevertheless, be substantially better suited for sewing together with the floating line (or sinking line).

By sewing the fastening line and floating line (or sinking line) directly together, there can be provided especially effective anchoring points for the meshes of the netting. This sewing together can be effected so that the netting line mesh does not need to form a direct abutment against the thread of the seam line but only against the fastening line and the floating line (or sinking line) in the junction between the latter. Another advantage is that the remaining meshes of the line of netting cannot be caught in the sewing thread as is the case where the sewing thread is bound about the lines at the fastening point.

I claim:

1. A process for producing net devices by mechanically mounting floating line means for the reception of floating material and sinking line means for the reception of weight-increasing material at local fastening points along opposite side edges of a line of netting by way of fastening lines associated with the latter which comprises the steps of:
   a. drawing the line of netting intermittently in a path through a mesh-diverging zone and a subsequent fastening zone controlled by said fastening lines each of which passes through its respective one of opposite rows of meshes at the opposite edges of said line of netting,
   b. maintaining said fastening lines constantly stretched out in both said mesh-diverging and fastening zone,
   c. causing said edge meshes in said mesh-diverging zone to be drawn freely in an upwardly and obliquely rising movement along said fastening lines whereby the weight of said netting has the effect of both ensuring a desired degree of spreading of said edge meshes on said lines and maintaining said meshes undisplaceably in position thereon in said fastening zone, and
   d. separately fastening said fastening lines to said floating and sinking lines respectively at said fastening points in said fastening zone, the edge meshes thus being anchored between said fastening points and by way of the latter being drawn forward in said intermittent movement between each fastening operation.

2. The process as claimed in claim 1, which comprises producing a fishing net device.

3. The process as claimed in claim 1, which comprises separately fastening said fastening lines to said floating and sinking lines respectively at said fastening points with sewing thread which provides a self-locking effect.

4. The process as claimed in claim 3, which comprises employing as fastening lines flat bands having a substantially greater breadth than height.

5. The process as claimed in claim 1, which comprises drawing the fastening lines synchronously.

6. The process as claimed in claim 5, which comprises drawing the fastening lines at adjustable speeds whereby a net device is provided having different lengths at the respective edges formed by the floating and sinking lines.

* * * * *